US010679573B2

(12) United States Patent
Qu et al.

(10) Patent No.: US 10,679,573 B2
(45) Date of Patent: Jun. 9, 2020

(54) PIXEL STRUCTURE, DISPLAY SUBSTRATE AND CONTROL METHOD THEREOF, DISPLAY DEVICE

(71) Applicants: BOE TECHNOLOGY GROUP CO., LTD., Beijing (CN); Beijing BOE Display Technology Co., Ltd., Beijing (CN)

(72) Inventors: Lianjie Qu, Beijing (CN); Zhidong Wang, Beijing (CN); Hebin Zhao, Beijing (CN); Yun Qiu, Beijing (CN); Weiwei Tong, Beijing (CN); Ning Jia, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 207 days.

(21) Appl. No.: 15/923,245

(22) Filed: Mar. 16, 2018

(65) Prior Publication Data

US 2019/0088215 A1     Mar. 21, 2019

(30) Foreign Application Priority Data

Sep. 15, 2017    (CN) .......................... 2017 1 0835047

(51) Int. Cl.
*G09G 3/36* (2006.01)
*G02F 1/1335* (2006.01)
(Continued)

(52) U.S. Cl.
CPC ........... *G09G 3/3607* (2013.01); *G02B 26/00* (2013.01); *G02F 1/13394* (2013.01);
(Continued)

(58) Field of Classification Search
CPC ......... G09G 3/3607; G09G 2300/0478; G09G 2300/0426; G09G 2300/0452;
(Continued)

(56) References Cited

U.S. PATENT DOCUMENTS 7,957,049 B1    6/2011  Parry-Jones
2006/0028708 A1*  2/2006  Miles ..................... B82Y 20/00
                                                                         359/290
(Continued)

FOREIGN PATENT DOCUMENTS

| CN | 101855586 A | 10/2010 |
| CN | 104360559 A | 2/2015 |
| WO | 2015026333 A1 | 2/2015 |

OTHER PUBLICATIONS

First Office Action for Chinese Patent Application No. 201710835047.3 dated Aug. 26, 2019.

*Primary Examiner* — Kent W Chang
*Assistant Examiner* — Andrew Lee
(74) *Attorney, Agent, or Firm* — Calfee, Halter & Griswold LLP

(57) ABSTRACT

The present disclosure discloses a pixel structure, including a reflective layer, a reflective electrode, a flexible electrode and a bottom electrode sequentially disposed along a direction of incident light. An optical resonant cavity is formed between the reflective layer and the reflective electrode, the reflective layer and the flexible electrode are connected to each other; and a first voltage is loaded between the reflective electrode and the flexible electrode, and a second voltage is loaded between the flexible electrode and the bottom electrode; depending on at least one of changes of the first voltage and the second voltage, the flexible electrode deforms along the direction of incident light, and drives the reflective layer to move along the direction of
(Continued)

incident light. The present disclosure also discloses a display substrate and a control method thereof and a display device.

14 Claims, 3 Drawing Sheets

(51) Int. Cl.
    *G02F 1/1343*     (2006.01)
    *G02F 1/1339*     (2006.01)
    *G02B 26/00*     (2006.01)

(52) U.S. Cl.
    CPC .... *G02F 1/13439* (2013.01); *G02F 1/133512* (2013.01); *G02F 1/133553* (2013.01); *G02F 1/134309* (2013.01); *G02F 2201/08* (2013.01); *G02F 2201/122* (2013.01); *G02F 2203/15* (2013.01); *G09G 2300/0426* (2013.01); *G09G 2300/0452* (2013.01); *G09G 2300/0478* (2013.01)

(58) Field of Classification Search
    CPC ........... G02F 1/133553; G02F 1/13439; G02F 1/134309; G02F 1/13394; G02F 1/133512; G02F 2203/15; G02F 2201/08; G02F 2201/122; G02B 26/00
    See application file for complete search history.

(56) References Cited

U.S. PATENT DOCUMENTS

| | | | |
|---|---|---|---|
| 2011/0019380 A1* | 1/2011 | Miles | G02B 26/0841 361/783 |
| 2013/0135319 A1* | 5/2013 | Ma | G02B 26/001 345/501 |
| 2015/0205092 A1 | 7/2015 | Sasagawa et al. | |

* cited by examiner

PIXEL STRUCTURE, DISPLAY SUBSTRATE AND CONTROL METHOD THEREOF, DISPLAY DEVICE

CROSS-REFERENCE TO RELATED APPLICATIONS

This application is based on and claim priority to Chinese Patent Application No. 201710835047.3, filed on Sep. 15, 2017, the entire contents thereof are incorporated herein by reference.

TECHNICAL FIELD

The present disclosure relates to the field of display technology, and in particular to a pixel structure, a display substrate, a control method thereof and a display device.

BACKGROUND

With the development of display technology, in the related art, a color display device with a metal total reflection layer in a display panel has been proposed. As shown in FIG. 1, a reflective layer 102 of highly reflective metal (e.g., aluminum, silver or the like) is disposed between a base substrate 101 and a transistor array 103. However, it is still necessary to provide a color filter layer 105 for filtering lights over a liquid crystal layer 104. With a display device of such configuration, by providing the reflective layer 102, it can allow lights emitted by a backlight source to be reflected by the reflective layer 102, thereby increasing the utilization of the backlight.

SUMMARY

The embodiments of the present disclosure provide a pixel structure, a display substrate, a control method thereof, and a display device, which can perform display without providing a color filter layer.

In a first aspect of the embodiments of the present disclosure, there is provided a pixel structure, including a reflective layer, a reflective electrode, a flexible electrode and a bottom electrode sequentially disposed along a direction of incident light, wherein an optical resonant cavity is formed between the reflective layer and the reflective electrode, the reflective layer and the flexible electrode are connected to each other; and a first voltage is loaded between the reflective electrode and the flexible electrode, and a second voltage is loaded between the flexible electrode and the bottom electrode; depending on a change of at least one of the first voltage and the second voltage, the flexible electrode deforms along the direction of incident light, and drives the reflective layer to move along the direction of incident light, such that a color of a light emitted from the optical resonant cavity is changeable.

Optionally, a through hole is provided at a center of the reflective electrode, the reflective layer and the flexible electrode are connected via a connecting pillar, and the connecting pillar passes through the through hole.

Optionally, the reflective layer is a resonant absorption layer.

Optionally, the resonant absorption layer is a transparent reflective material formed with a chrome metal film layer.

Optionally, the pixel structure further includes a first base substrate and a first supporting pillar, wherein the bottom electrode is disposed on the first base substrate, the first supporting pillar is disposed on the first base substrate and at the same side of the first base substrate as the bottom electrode, the reflective electrode is disposed on the top of the first supporting pillar, and the flexible electrode is disposed on and supported by the first supporting pillar between the bottom electrode and the reflective electrode.

Optionally, the pixel structure further includes a second base substrate and a second supporting pillar, wherein the reflective layer is made of an elastic material, and an edge of the reflective layer is secured on the base substrate via the second supporting pillar.

According to a second aspect of the embodiments of the present disclosure, there is provided a display substrate, including at least one pixel unit, the pixel unit including three pixel structures, each of the pixel structures being the pixel structure according to any one of the above, and the pixel structures being separated by a pixel defining layer.

Optionally, the display substrate further includes a movable shielding layer, wherein the movable shielding layer is disposed on a side of an incident surface of the reflective layer and is movable horizontally in a direction perpendicular to the incident light, to change the transmittance of at least one of incident light and exiting light.

Optionally, the movable shielding layer includes three movable shielding sub-layers, and the three movable shielding sub-layers respectively block three of the pixel structures; and the movable shielding sub-layer includes a first shielding member and a second shielding member, a gap between the first shielding member and the second shielding member is configured to transmit at least one of the incident light and the exiting light, and at least one of the first shielding member and the second shielding member is movable.

Optionally, a projection of at least one of the first shielding member and the second shielding member on the reflective layer in the direction of incident light is corresponding to the position of the pixel defining layer.

Optionally, a cross-sectional shape of at least one of the first shielding member and the second shielding member in a direction perpendicular to the incident light is at least one of rectangle, semicircle, semi-ellipse, triangle and zigzag.

According to a third aspect of the embodiments of the present disclosure, there is provided a display device, including the display substrate according to any one of the above.

According to a fourth aspect of the embodiments of the present disclosure, there is provided a control method applied to the display substrate described above, including:

calculating a distance between the reflective layer and the reflective electrode of each of the three pixel structures according to exiting lights respectively required to be emitted by the three pixel structures of the pixel unit;

calculating at least one of a first voltage to be loaded between the reflective electrode and the flexible electrode and a second voltage to be loaded between the flexible electrode and the bottom electrode of each of the three pixel structures according to the distance between the reflective layer and the reflective electrode of each of the three pixel structures; and loading at least one of the first voltage between the reflective electrode and the flexible electrode and the second voltage between the flexible electrode and the bottom electrode, such that the three pixel structures of the pixel unit respectively emit three different kinds of exiting lights, so as to be mixed to form a desired color for the pixel unit.

Optionally, the three pixel structures of the pixel unit emit red light, green light and blue light respectively.

Optionally, the method further includes:

calculating durations respectively for the three pixel structures emitting exiting lights in a cycle for displaying one frame of the pixel unit, according to intensities of exiting lights required to be emitted respectively from the three pixel structures of the pixel unit; and respectively controlling the three pixel structures to emit light of the corresponding color according to the durations respectively for the three pixel structures emitting exiting lights.

DETAILED DESCRIPTION

Figure 1:
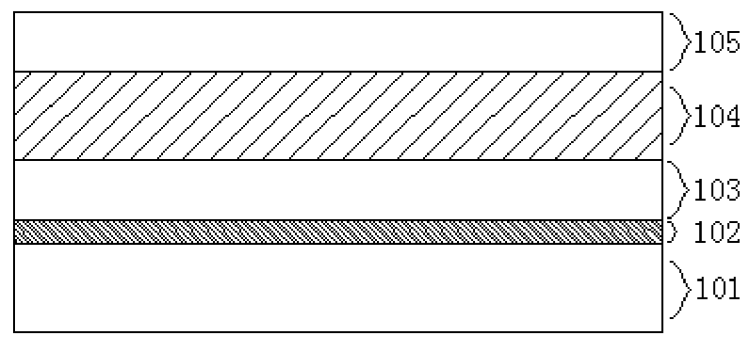
FIG. 1 is a schematic structural diagram of a display panel in the related art.

To make the objectives, technical solutions, and advantages of the present disclosure clearer, the present disclosure is further described in detail below with reference to the accompanying drawings with reference to the accompanying drawings.

It should be noted that all the expressions using the term "first" or "second" in the embodiments of the present disclosure are used to distinguish two entities with the same name that are not the same or have different parameters, and it can be seen that the terms "first" and the "second" are only used for convenience of description, and it should not be construed as a limitation on the embodiments of the present disclosure. In the embodiments below this will not be noted repeatedly.

According to a first aspect of the embodiments of the present disclosure, an embodiment of a pixel structure is provided, which can perform display without providing a color filter layer.

The pixel structure includes a reflective layer, a reflective electrode, a flexible electrode and a bottom electrode which are sequentially disposed along a direction of incident light. An optical resonant cavity is formed between the reflective layer and the reflective electrode, and the reflective layer and the flexible electrode are connected to each other.

A first voltage is loaded between the reflective electrode and the flexible electrode, and a second voltage is loaded between the flexible electrode and the bottom electrode. Depending on a change of at least one of the first voltage and the second voltage, the flexible electrode deforms along the direction of incident light, and drives the reflective layer to move along the direction of incident light, such that the color of the light emitted from the optical resonant cavity is changeable. Here, a distance between the reflective electrode and the flexible electrode may be changed by changing the first voltage, such that the flexible electrode drives the reflective layer to move, thereby the color of the light emitted from the optical resonant cavity may be changeable. Alternatively, a distance between the flexible electrode and the bottom electrode may be changed by changing the second voltage, such that the flexible electrode drives the reflective layer to move, thereby the color of the light emitted from the optical resonant cavity may be changeable. Alternatively, both of the distance between the reflective electrode and the flexible electrode and the distance between the flexible electrode and the bottom electrode may be controlled to be changed by adjusting both of the first voltage and the second voltage. It may be selected according to actual needs in practical application.

It can be seen from the above embodiment that in the pixel structure provided by the embodiment of the present disclosure, the reflective layer, the reflective electrode, the flexible electrode and the bottom electrode are provided, the reflective layer and the flexible electrode are connected to each other, and by controlling at least one of the first voltage loaded between the reflective electrode and the flexible electrode and the second voltage loaded between the flexible electrode and the bottom electrode, the flexible electrode may deform along the direction of the incident light and drive the reflective layer to move along the direction of the incident light, thereby the color of the light emitted from the optical resonant cavity may be changeable. In this way, it can achieve color display without a color filter layer, and it can realize high resolution and low power consumption.

Figure 2A:
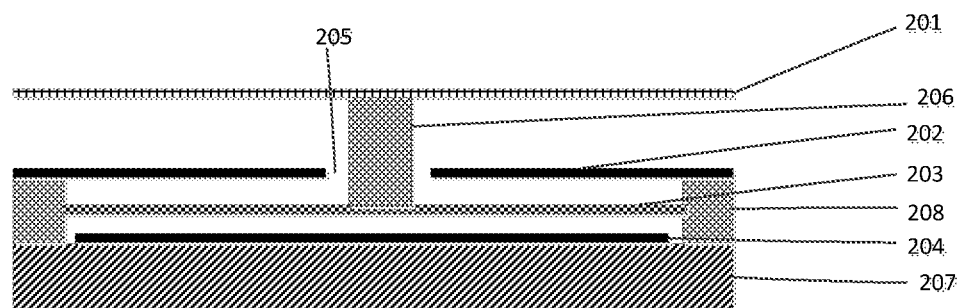
FIG. 2A is a schematic structural diagram of a pixel structure according to an embodiment of the present disclosure.

An embodiment of the present disclosure further provides an embodiment of a pixel structure, which can perform display without providing a color filter layer. FIG. 2A is a schematic structural diagram of a pixel structure according to an embodiment of the present disclosure.

The pixel structure includes a reflective layer 201, a reflective electrode 202, a flexible electrode 203 and a bottom electrode 204 disposed sequentially along a direction of incident light. An optical resonant cavity is formed between the reflective layer 201 and the reflective electrode 202. The reflective layer 201 and the flexible electrode 203 are connected to each other.

Optionally, a through hole 205 is provided at the center of the reflective electrode 202, the reflective layer 201 and the flexible electrode 203 are connected via a connecting pillar 206, and the connecting pillar 206 passes through the through hole 205. With such simple structure design, the function of the optical resonant cavity is not susceptible to the complex internal structure. Optionally, the reflective layer 201 is a resonant absorption layer. By providing the reflective layer 201 as a resonant absorption layer, on the one hand, the reflective layer 201 may achieve reflection function, and on the other hand, the reflective layer 201 may absorb light of an undesired wavelength. Optionally, the resonant absorption layer is a transparent reflective material formed with a chrome metal film layer. By forming a chrome metal film layer, reflectivity and transmittance of the resonant absorption layer is more compatible to the requirements, and the function of the resonant absorption layer can be better realized.

Optionally, the pixel structure further includes a first base substrate 207 and a first supporting pillar 208. The bottom electrode 204 is disposed on the first base substrate 207. The first supporting pillar 208 is disposed on the first base substrate 207 and at the same side of the first base substrate 207 as the bottom electrode 204. The reflective electrode 202 is disposed on the top of the first supporting pillar 208. The flexible electrode 203 is disposed on and supported by the first supporting pillar 208 between the bottom electrode 204 and the reflective electrode 202. With such structure design, it can facilitate control of the deformation of the flexible electrode, and facilitate control of the color of the light emitted from the pixel structure. Optionally, the first supporting pillar 208 may be a square frame provided around the bottom electrode 204 such that the entire pixel structure may be stably supported.

A first voltage is loaded between the reflective electrode 202 and the flexible electrode 203, and a second voltage is loaded between the flexible electrode 203 and the bottom electrode 204. Depending on a change of at least one of the first voltage and the second voltage, the flexible electrode deforms along the direction of incident light, and drives the reflective layer to move along the direction of incident light, such that the color of the light emitted from the optical resonant cavity is changeable. Here, a distance between the reflective electrode and the flexible electrode may be changed by changing the first voltage, such that the flexible electrode drives the reflective layer to move, thereby the color of the light emitted from the optical resonant cavity may be changeable. Alternatively, a distance between the flexible electrode and the bottom electrode may be changed by changing the second voltage, such that the flexible electrode drives the reflective layer to move, thereby the color of the light emitted from the optical resonant cavity may be changeable. Alternatively, both of the distance between the reflective electrode and the flexible electrode and the distance between the flexible electrode and the bottom electrode may be controlled to be changed by adjusting both of the first voltage and the second voltage. It may be selected according to actual needs in practical application.

Figure 2B:
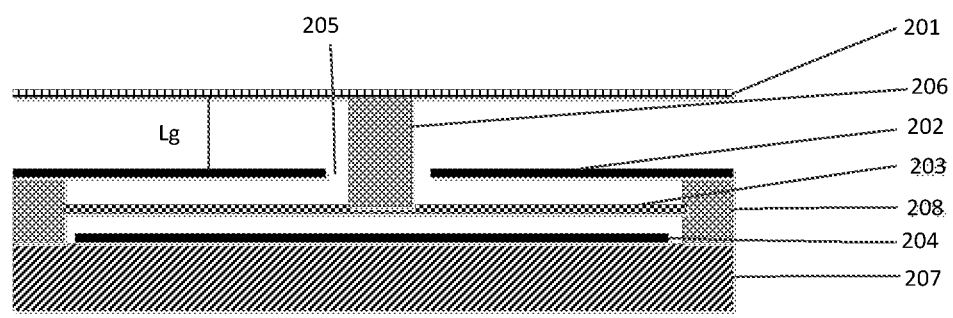
FIG. 2B is a schematic diagram of a state when no voltage is loaded between electrodes in a pixel structure according to an embodiment of the present disclosure.
Figure 2C:
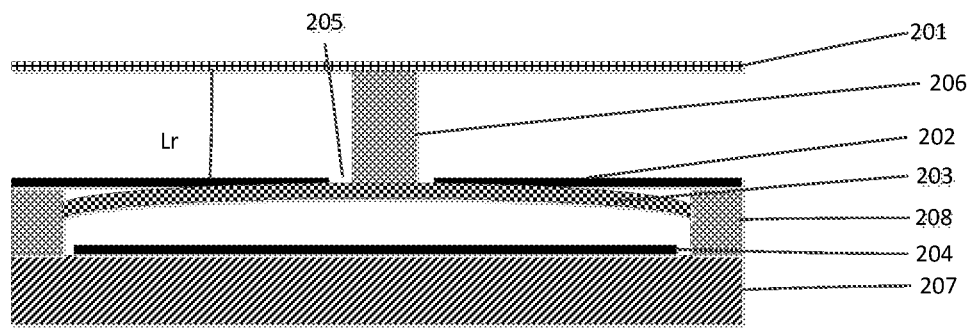
FIG. 2C is a schematic diagram of a state when a first voltage is loaded between a flexible electrode and a reflective electrode in a pixel structure according to an embodiment of the present disclosure.
Figure 2D:
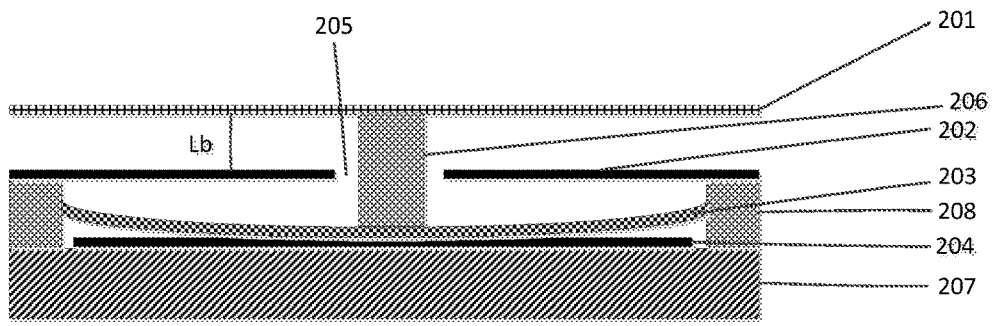
FIG. 2D is a schematic diagram of a state when a second voltage is loaded between a flexible electrode and a bottom electrode in a pixel structure according to an embodiment of the present disclosure.

In an embodiment, when the distance between the reflective layer 201 and the reflective electrode 202 is a half wavelength of red light or an integral multiple thereof, the light emitted from the optical resonant cavity is red; when the distance between the reflective layer 201 and the reflective electrode 202 is a half wavelength of green light or an integral multiple thereof, the light emitted from the optical resonant cavity is green; and when the distance between the reflective layer 201 and the reflective electrode 202 is a half wavelength of blue light or an integral multiple thereof, the light emitted from the optical resonant cavity is blue. Therefore, referring to FIGS. 2a-2c, optionally, the flexible electrode 203 may be clipped at a corresponding position of the first supporting pillar 208, such that when the pixel structure is powered off, the distance Lg between the reflective layer 201 and the reflective electrode 202 is a half wavelength of green light or an integral multiple thereof (as shown in FIG. 2B), thereby the pixel structure may form green exiting light when the power is off. When a sufficient first voltage is loaded between the flexible electrode 203 and the reflective electrode 202, the flexible electrode 203 is in contact with the reflective electrode 202, such that the distance Lr between the reflective layer 201 and the reflective electrode 202 is a half wavelength of red light or an integral multiple thereof (as shown in FIG. 2C) when a sufficient first voltage is loaded, thereby the pixel structure may form red exiting light when a sufficient first voltage is loaded. When a sufficient second voltage is loaded between the flexible electrode 203 and the bottom electrode 204, the flexible electrode 203 is in contact with the bottom electrode 204, such that the distance Lb between the reflective layer 201 and the reflective electrode 202 is a half wavelength of blue light or an integral multiple thereof (as shown in FIG. 2D) when a sufficient second voltage is loaded, thereby the pixel structure may form blue exiting light when a sufficient second voltage is loaded. In this way, as long as the corresponding pixel structure is loaded with the corresponding voltage, exiting light of desired color may be formed.

It can be seen from the above embodiment that in the pixel structure provided by the embodiment of the present disclosure, the reflective layer, the reflective electrode, the flexible electrode and the bottom electrode are provided, the reflective layer and the flexible electrode are connected to each other, and by controlling at least one of the first voltage loaded between the reflective electrode and the flexible electrode and the second voltage loaded between the flexible electrode and the bottom electrode, the flexible electrode may deform along the direction of the incident light and drive the reflective layer to move along the direction of the incident light, thereby the color of the light emitted from the optical resonant cavity may be changeable. In this way, it can achieve color display without a color filter layer, and it can realize high resolution and low power consumption.

Figure 3:
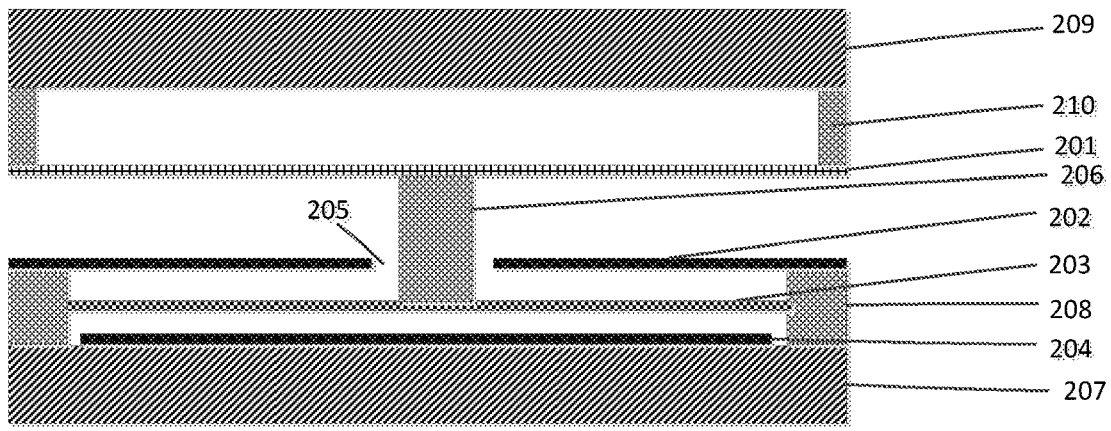
FIG. 3 is a schematic structural diagram of a pixel structure according to another embodiment of the present disclosure.

An embodiment of the present disclosure further provides another embodiment of a pixel structure, which can display without providing a color filter layer. FIG. 3 is a schematic structural diagram of a pixel structure according to another embodiment of the present disclosure.

The pixel structure includes a reflective layer 201, a reflective electrode 202, a flexible electrode 203 and a bottom electrode 204 disposed sequentially along a direction of incident light. An optical resonant cavity is formed between the reflective layer 201 and the reflective electrode 202. The reflective layer 201 and the flexible electrode 203 are connected to each other.

A through hole 205 is provided at the center of the reflective electrode 202, the reflective layer 201 and the flexible electrode 203 are connected via a connecting pillar 206, and the connecting pillar 206 passes through the through hole 205. With such simple structure design, the function of the optical resonant cavity is not susceptible to the complex internal structure. Optionally, the reflective layer 201 is a resonant absorption layer. By providing the reflective layer 201 as a resonant absorption layer, on the one hand, the reflective layer 201 may achieve reflection function, and on the other hand, the reflective layer 201 may absorb light of an undesired wavelength. Optionally, the resonant absorption layer is a transparent reflective material formed with a chrome metal film layer. By forming a chrome metal film layer, reflectivity and transmittance of the resonant absorption layer is more compatible to the requirements, and the function of the resonant absorption layer can be better realized.

The pixel structure further includes a first base substrate 207 and a first supporting pillar 208. The bottom electrode 204 is disposed on the first base substrate 207. The first supporting pillar 208 is disposed on the first base substrate 207 and at the same side of the first base substrate 207 as the bottom electrode 204. The reflective electrode 202 is disposed on the top of the first supporting pillar 208. The flexible electrode 203 is disposed on and supported by the first supporting pillar 208 between the bottom electrode 204 and the reflective electrode 202. With such structure design, it can facilitate control of the deformation of the flexible electrode, and facilitate control of the color of the light emitted from the pixel structure. Optionally, the first supporting pillar 208 may be a square frame provided around the bottom electrode 204 such that the entire pixel structure may be stably supported.

The pixel structure further includes a second base substrate 209 and a second supporting pillar 210. The reflective layer 201 is made of an elastic material, and an edge of the reflective layer 201 is secured on the base substrate 209 via the second supporting pillar 210. Such structure design can improve the stability of the reflective layer 201 and prevent problems such as displacement due to external forces. Optionally, the second supporting pillar 210 may be a square frame provided around the edge of the reflective layer 201 such that the entire pixel structure may be stably supported.

A first voltage is loaded between the reflective electrode 202 and the flexible electrode 203, and a second voltage is loaded between the flexible electrode 203 and the bottom electrode 204. Depending on a change of at least one of the first voltage and the second voltage, the flexible electrode deforms along the direction of incident light, and drives the reflective layer to move along the direction of incident light, such that the color of the light emitted from the optical resonant cavity is changeable. Here, a distance between the reflective electrode and the flexible electrode may be changed by changing the first voltage, such that the flexible electrode drives the reflective layer to move, thereby the color of the light emitted from the optical resonant cavity may be changeable. Alternatively, a distance between the flexible electrode and the bottom electrode may be changed by changing the second voltage, such that the flexible electrode drives the reflective layer to move, thereby the color of the light emitted from the optical resonant cavity may be changeable. Alternatively, both of the distance between the reflective electrode and the flexible electrode and the distance between the flexible electrode and the bottom electrode may be controlled to be changed by adjusting both of the first voltage and the second voltage. It may be selected according to actual needs in practical application.

It can be seen from the above embodiment that in the pixel structure provided by the embodiment of the present disclosure, the reflective layer, the reflective electrode, the flexible electrode and the bottom electrode are provided, the reflective layer and the flexible electrode are connected to each other, and by controlling at least one of the first voltage loaded between the reflective electrode and the flexible electrode and the second voltage loaded between the flexible electrode and the bottom electrode, the flexible electrode may deform along the direction of the incident light and drive the reflective layer to move along the direction of the incident light, thereby the color of the light emitted from the optical resonant cavity may be changeable. In this way, it can achieve color display without a color filter layer, and it can realize high resolution and low power consumption.

Figure 4:
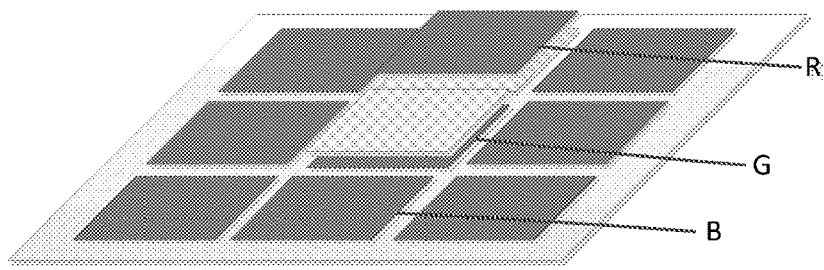
FIG. 4 is a schematic structural diagram of a display substrate according to an embodiment of the present disclosure.

According to a second aspect of the embodiments of the present disclosure, an embodiment of a display substrate is provided, which can perform display without providing a color filter layer. FIG. 4 is a schematic structural diagram of a display substrate according to an embodiment of the present disclosure.

The display substrate includes at least one pixel unit. The pixel unit includes three pixel structures as described in any of the previous embodiments. The pixel structures are separated by a pixel defining layer (not shown in FIG. 4). Referring to FIG. 4, when the pixel unit is in an operating state, the three pixel structures are respectively loaded with different voltages such that the optical resonant cavities of the three pixel structures form different gaps, and thereby the pixel structure R emits red light and the pixel structure G emits Green, and pixel structure B emits blue light.

It can be seen from the above embodiment that in the display substrate provided by the embodiment of the present disclosure, the pixel structure of the display substrate is provided with the reflective layer, the reflective electrode, the flexible electrode and the bottom electrode, the reflective layer and the flexible electrode are connected to each other, and by controlling at least one of the first voltage loaded between the reflective electrode and the flexible electrode and the second voltage loaded between the flexible electrode and the bottom electrode, the flexible electrode may deform along the direction of the incident light and drive the reflective layer to move along the direction of the incident light, thereby the color of the light emitted from the optical resonant cavity may be changeable. In this way, it can achieve color display without a color filter layer, and it can realize high resolution and low power consumption.

Figure 5:
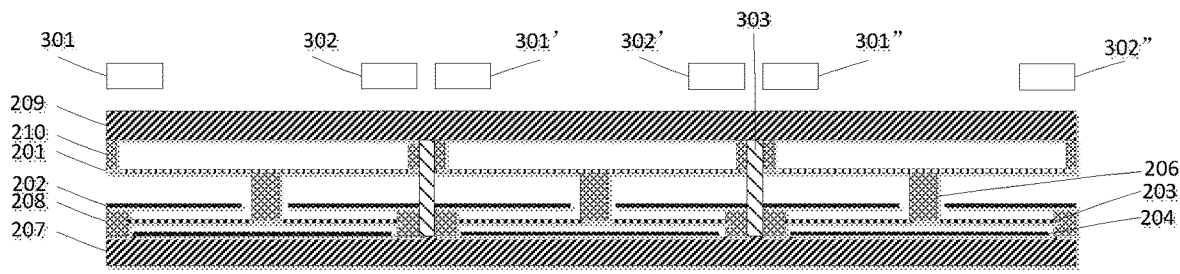
FIG. 5 is a schematic structural diagram of a display substrate according to another embodiment of the present disclosure.
Figure 6:
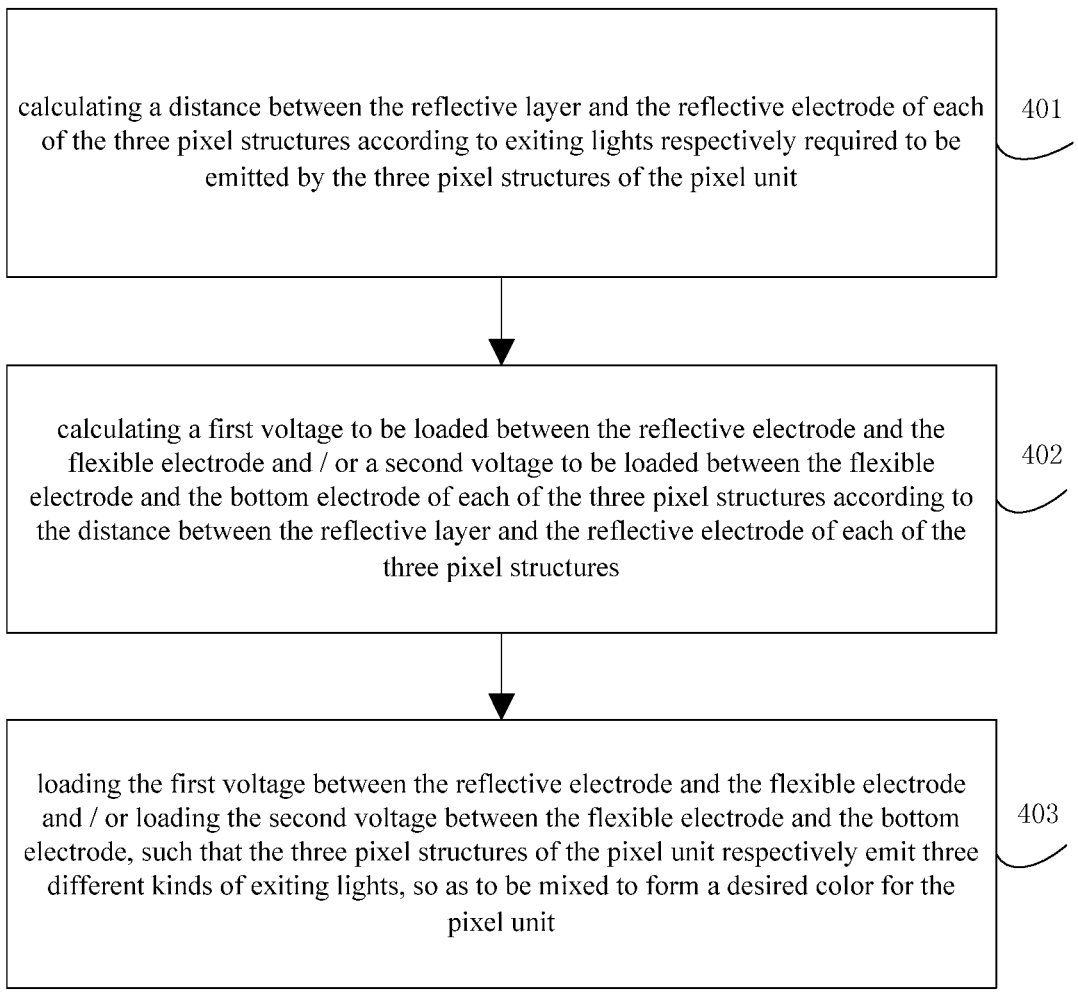
FIG. 6 is a schematic flow chart of a method for controlling a display substrate according to an embodiment of the present disclosure.

An embodiment of the present disclosure further provides another embodiment of the display substrate, which can perform display without providing a color filter layer. FIG. 5 is a schematic structural diagram of a display substrate according to another embodiment of the present disclosure.

The display substrate includes at least one pixel unit including three pixel structures as described in any of the previous embodiments. The pixel structures is separated by a pixel defining layer 303.

Optionally, the display substrate further includes a movable shielding layer. The movable shielding layer is disposed on a side of the incident surface of the reflective layer and is movable horizontally in a direction perpendicular to the incident light, for changing the transmittance of at least one of the incident light and the exiting light. In this way, at least one of the transmittance of the incident light and that of the exiting light can be changed by the movable shielding layer, so as to realize the adjustment of the grayscale of each pixel structure.

Optionally, as shown in FIG. 5, the movable shielding layer includes three movable shielding sub-layers, and the three movable shielding sub-layers respectively cover the three pixel structures.

The movable shielding sub-layer includes a first shielding member 301, 301', 301" and a second shielding member 302, 302', 302". A gap between the first shielding member 301, 301', 301" and the second shielding member 302, 302', 302" may allow at least one of incident light and exiting light to pass therethrough. The first shielding member 301, 301', 301" and the second shielding member 302, 302', 302" are movable. In this way, the gap between the first shielding member and the second shielding member may be adjusted by the movement of at least one of the first shielding member and the second shielding member, to adjust at least one of the transmittance of incident light and the transmittance of the reflected light, in order to achieve the adjustment of grayscale for the pixel structures.

The widths of the first shielding member 301, 301', 301" and the second shielding member 302, 302', 302" of the movable shielding sub-layer shown in FIG. 5 are relatively narrow. In practical, when the movable shielding layer is implemented, the gap between the first shielding member 301, 301', 301" and the second shielding member 302, 302', 302" may be completely closed, such that no light enters the optical resonant cavity, that is, forming a black state. When the movable shielding sub-layer moves horizontally, bright states of various grayscales may be formed in transition. When the overlapping area of the gap between the first shielding member 301, 301', 301" and the second shielding member 302, 302', 302" with the enclosure cavity is the maximum, the bright state is the brightest state.

Optionally, the movable shielding layer is implemented by using a DMS (Digital Micro Shutter) technology. In this way, whether to transmit the incident light or not and how much of the incident light is transmitted may be controlled by controlling whether the movable shutter blocks the gap or not and the movable shutter blocks how much of the gap, such that it can the function of the light modulator, and can display in transition from the black state to the white state by the pixel structure. The switching circuit design in the DMS technology can be utilized to control the movable shielding layer to move horizontally in the direction perpendicular to the incident light and control. The transmittance of the exiting light of the three colors reflected from the optical resonant cavity may be controlled by the displacement of the movable shielding layer under different voltages.

In order to facilitate the shielding of the corresponding positions of the pixel structure, at least one of the widths of the first shielding member 301, 301', 301" and the second shielding member 302, 302', 302" in the arrangement direction of the pixel structure may be prolonged. When the position of the first shielding member 301, 301', 301" and the position of the second shielding member 302, 302', 302" are mutually exclusive, the adjacent shielding members may be arranged in a staggered manner.

Optionally, at least one of the horizontal moving direction of the first shielding member 301, 301', 301" and the second shielding member 302, 302', 302" may not only be the horizontal moving direction along the arrangement direction of the pixel structure, but may also be a horizontal moving direction perpendicular to the arrangement direction of the pixel structure (referring to FIG. 5, the horizontal moving direction perpendicular to the arrangement direction of the pixel structure is the direction perpendicular to the paper). It should be noted that at least one of the horizontal moving directions of the first shielding member 301, 301', 301" and the second shielding member 302, 302', 302" may not be particularly limited as long as the direction of the incident light and/or the transmittance of the exiting light can be adjusted.

Optionally, at least one of projections of the first shielding member 301, 301', 301" and the second shielding member 302, 302', 302" on the reflective layer 201 in the direction of the incident light are respectively corresponding to the positions of the pixel defining layer 303, at least one of the first supporting pillar 208 and the second supporting pillar 210. For example, referring to FIG. 5, the position of the projections may be respectively corresponding to the positions of the first supporting pillar 208 and the second supporting pillar 210. In this way, at least one of the first shielding member 301, 301', 301" and the second shielding member 302, 302', 302" can block at least one of the corresponding positions of the pixel defining layer 303, the first supporting pillar 208 and the second supporting pillar 210, to play the function of a black matrix and alleviate the problem of light leakage and light mixing of the pixel structure.

Optionally, at least one of the cross-sectional shapes of the first shielding member 301, 301', 301" and the second shielding member 302, 302', 302" perpendicular to the direction of the incident light may be at least one of rectangle, semicircle, semi-ellipse, triangle and zigzag. In addition to the aforementioned shapes, at least one of the cross-sectional shapes of the first shielding member 301, 301', 301" and the second shielding member 302, 302', 302" perpendicular to the direction of the incident light may be other regular geometric shape or irregular geometric shape. At least one of the cross-sectional shapes of the first shielding member 301, 301', 301" and the second shielding member 302, 302', 302" perpendicular to the direction of the incident light is not limited as long as the grayscale can be adjusted by moving at least one of the first shielding member 301, 301', 301" and the second shielding member 302, 302', 302". All of the first shielding member 301, 301', 301" and the second shielding member 302, 302', 302" that can achieve this function fall within the protective scope of the present disclosure.

Optionally, when at least one of the first shielding member 301, 301', 301" and the second shielding member 302, 302', 302" is mutually exclusive in size relationship (they cannot co-exist in the same plane or cannot freely move), it is possible to arrange the first shielding member and the second shielding member in a staggered manner such that the two shielding members are not in the same plane, such that the size of the shielding members can be designed in a wider range.

It should be noted that, in the above embodiments, the pixel structures are arranged in a transverse direction. However, it can be seen that in addition to the pixel structures of transverse arrangement, it is possible to arrange the pixel structures in a triangle arrangement. In addition, it is possible to arrange the pixel structures in other arrangement. Any other arrangement of pixel structures that can be implemented should be within the protection scope of the present disclosure without departing from the inventive concept of the present disclosure.

It can be seen from the above embodiment that in the display substrate provided by the embodiment of the present disclosure, the pixel structure of the display substrate is provided with the reflective layer, the reflective electrode, the flexible electrode and the bottom electrode, the reflective layer and the flexible electrode are connected to each other, and by controlling at least one of the first voltage loaded between the reflective electrode and the flexible electrode and the second voltage loaded between the flexible electrode and the bottom electrode, the flexible electrode may deform along the direction of the incident light and drive the reflective layer to move along the direction of the incident light, thereby the color of the light emitted from the optical resonant cavity may be changeable. In this way, it can achieve color display without a color filter layer, and it can realize high resolution and low power consumption. Moreover, by providing a movable shielding layer, it can realize grayscale adjustment of the pixel units, with simple structure and easy implementation.

According to a third aspect of the embodiments of the present disclosure, there is provided an embodiment of a display device, which can perform display without providing a color filter layer.

The display device includes a display substrate as described in any of the aforesaid embodiments.

It can be seen from the above embodiment that in the display device provided by the embodiment of the present disclosure, the pixel structure of the display device is provided with the reflective layer, the reflective electrode, the flexible electrode and the bottom electrode, the reflective layer and the flexible electrode are connected to each of at least one of her, and by controlling the first voltage loaded between the reflective electrode and the flexible electrode and the second voltage loaded between the flexible electrode and the bottom electrode, the flexible electrode may deform along the direction of the incident light and drive the reflective layer to move along the direction of the incident light, thereby the color of the light emitted from the optical resonant cavity may be changeable. In this way, it can achieve color display without a color filter layer, and it can realize high resolution and low power consumption.

It should be noted that the display device in this embodiment may be any product or component that has a display function such as an electronic paper, a cell phone, a tablet, a television, a notebook computer, a digital photo frame, a navigator, and the like.

According to a fourth aspect of the embodiments of the present disclosure, there is provided an embodiment of a control method applied to the display substrate as described above.

The control method applied to the display substrate as described above includes the following steps.

In step 401, a distance between the reflective layer and the reflective electrode of each of the three pixel structures is calculated according to exiting lights respectively required to be emitted by the three pixel structures of the pixel unit.

In step 402, at least one of a first voltage to be loaded between the reflective electrode and the flexible electrode and a second voltage to be loaded between the flexible electrode and the bottom electrode of each of the three pixel structures is calculated according to the distance between the reflective layer and the reflective electrode of each of the three pixel structures.

In step 403, at least one of the first voltage is loaded between the reflective electrode and the flexible electrode and the second voltage is loaded between the flexible electrode and the bottom electrode such that the three pixel structures of the pixel unit respectively emit three different kinds of exiting lights, so as to be mixed to form a desired color for the pixel unit. Preferably, the three pixel structures of the pixel unit respectively emit red exiting light, green exiting light and blue exiting light.

It can be seen from the above embodiment that in the method for controlling a display substrate provided by the embodiment of the present disclosure, when applied to the display substrate according to the previous embodiments, it can achieve color display without a color filter layer by control the voltages loaded to the electrodes of the pixel structures.

Optionally, the control method applied to the display substrate as described above further includes the following steps.

According to the intensities of exiting lights required to be emitted respectively from the three pixel structures of the pixel unit, durations respectively for the three pixel structures emitting exiting lights in a cycle for displaying one frame of the pixel unit are calculated.

The three pixel structures are respectively controlled to emit light of the corresponding color according to the durations respectively for the three pixel structures emitting exiting lights.

By controlling the duty cycle in such way, it can facilitate control of the intensity of exiting light of the pixel structure, and control the display grayscales of the pixel structures.

This embodiment and the aforementioned embodiment of the movable shielding layer can be applied separately. However, the two embodiments may also be combined to further subdivide the grayscale.

It should be understood by those of ordinary skill in the art that the foregoing is only the specific embodiments of the present disclosure and is not intended to limit the present disclosure. Any modifications, equivalent replacements, and improvements made within the spirit and principle of the present disclosure should be included in the protection scope of the present disclosure.

What is claimed is:

1. A pixel structure, comprising a reflective layer, a reflective electrode, a flexible electrode and a bottom electrode sequentially disposed along a direction of incident light, wherein an optical resonant cavity is formed between the reflective layer and the reflective electrode, wherein the reflective layer and the flexible electrode are connected to each other; and wherein a first voltage is loaded between the reflective electrode and the flexible electrode, and a second voltage is loaded between the flexible electrode and the bottom electrode; depending on at least one of changes of the first voltage and the second voltage, the flexible electrode deforms along the direction of incident light, and drives the reflective layer to move along the direction of incident light, such that a color of a light emitted from the optical resonant cavity is changeable, and a through hole is provided at a center of the reflective electrode, the reflective layer and the flexible electrode are connected via a connecting pillar, and the connecting pillar passes through the through hole.

2. The pixel structure according to claim 1, wherein the reflective layer is a resonant absorption layer.

3. The pixel structure according to claim 2, wherein the resonant absorption layer is a transparent reflective material formed with a chrome metal film layer.

4. The pixel structure according to claim 1, further comprising a first base substrate and a first supporting pillar, wherein the bottom electrode is disposed on the first base substrate, the first supporting pillar is disposed on the first base substrate and at the same side of the first base substrate as the bottom electrode, the reflective electrode is disposed on the top of the first supporting pillar, and the flexible electrode is disposed on and supported by the first supporting pillar between the bottom electrode and the reflective electrode.

5. The pixel structure according to claim 4, further comprising a second base substrate and a second supporting pillar, wherein the reflective layer is made of an elastic material, and an edge of the reflective layer is secured on the base substrate via the second supporting pillar.

6. A display substrate, comprising at least one pixel unit, the pixel unit comprising three pixel structures, separated by a pixel defining layer, and each comprising: a reflective layer, a reflective electrode, a flexible electrode and a bottom electrode sequentially disposed along a direction of incident light, wherein an optical resonant cavity is formed between the reflective layer and the reflective electrode, the reflective layer and the flexible electrode are connected to each other; and wherein a first voltage is loaded between the reflective electrode and the flexible electrode, and a second voltage is loaded between the flexible electrode and the bottom electrode; depending on at least one of changes of the first voltage and the second voltage, the flexible electrode deforms along the direction of incident light, and drives the reflective layer to move along the direction of incident light, such that a color of a light emitted from the optical resonant cavity is changeable, and a through hole is provided at a center of the reflective electrode, the reflective layer and the flexible electrode are connected via a connecting pillar, and the connecting pillar passes through the through hole.

7. The display substrate according to claim 6, further comprising a movable shielding layer, wherein the movable shielding layer is disposed on a side of an incident surface of the reflective layer and is movable horizontally in a direction perpendicular to the incident light, to change at least one of the transmittance of incident light and that of exiting light.

8. The display substrate according to claim 7, wherein the movable shielding layer comprises three movable shielding sub-layers, and the three movable shielding sub-layers respectively block three of the pixel structures; and the movable shielding sub-layer comprises a first shielding member and a second shielding member, a gap between the first shielding member and the second shielding member is configured to transmit at least one of incident light and exiting light, and at least one of the first shielding member and the second shielding member is movable.

9. The display substrate according to claim 8, wherein at least one of projections of the first shielding member and the second shielding member on the reflective layer in the direction of incident light is corresponding to the position of the pixel defining layer.

10. The display substrate according to claim 8, wherein at least one of cross-sectional shapes of the first shielding member and the second shielding member in a direction perpendicular to the incident light is at least one of rectangle, semicircle, semi-ellipse, triangle and zigzag.

11. A display device, comprising the display substrate according to claim 6.

12. A control method applied to the display substrate according to claim 6, comprising:

calculating a distance between the reflective layer and the reflective electrode of each of the three pixel structures according to exiting lights respectively required to be emitted by the three pixel structures of the pixel unit;

calculating at least one of a first voltage to be loaded between the reflective electrode and the flexible electrode and a second voltage to be loaded between the flexible electrode and the bottom electrode of each of the three pixel structures according to the distance between the reflective layer and the reflective electrode of each of the three pixel structures; and loading at least one of the first voltage between the reflective electrode and the flexible electrode and the second voltage between the flexible electrode and the bottom electrode, such that the three pixel structures of the pixel unit respectively emit three different kinds of exiting lights, so as to be mixed to form a desired color for the pixel unit.

13. The method according to claim 12, wherein the three pixel structures of the pixel unit emit red light, green light and blue light respectively.

14. The method according to claim 12, further comprising:

calculating durations respectively for the three pixel structures emitting exiting lights in a cycle for displaying one frame of the pixel unit, according to intensities of exiting lights required to be emitted respectively from the three pixel structures of the pixel unit; and respectively controlling the three pixel structures to emit light of the corresponding color according to the durations respectively for the three pixel structures emitting exiting lights.

* * * * *